(12) United States Patent
Kitazawa et al.

(10) Patent No.: US 10,190,621 B2
(45) Date of Patent: Jan. 29, 2019

(54) OUTER CASING FOR CONTROL CABLE, METHOD OF MANUFACTURING THE SAME, AND CONTROL CABLE

(71) Applicant: NHK SPRING CO., LTD., Yokohama (JP)

(72) Inventors: Akihiko Kitazawa, Ina (JP); Iroku Suzuki, Ina (JP); Kouichi Kusakawa, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 14/910,993

(22) PCT Filed: Aug. 8, 2014

(86) PCT No.: PCT/JP2014/071092
§ 371 (c)(1),
(2) Date: Feb. 8, 2016

(87) PCT Pub. No.: WO2015/020211
PCT Pub. Date: Feb. 12, 2015

(65) Prior Publication Data
US 2016/0186797 A1    Jun. 30, 2016

(30) Foreign Application Priority Data

Aug. 9, 2013 (JP) ................................. 2013-167075

(51) Int. Cl.
*F16C 1/26* (2006.01)
*F16C 1/10* (2006.01)

(52) U.S. Cl.
CPC ............... *F16C 1/267* (2013.01); *F16C 1/10* (2013.01); *F16C 1/26* (2013.01); *F16C 2208/20* (2013.01);
(Continued)

(58) Field of Classification Search
CPC .. F16C 1/267; F16C 2208/20; F16C 2208/70; F16C 2240/06; F16C 2240/60
(Continued)

(56) References Cited

U.S. PATENT DOCUMENTS 4,463,779 A * 8/1984 Wink .................... F16L 11/121
138/103
4,817,673 A * 4/1989 Zoghby .................. B29C 47/02
102/275.1
(Continued)

FOREIGN PATENT DOCUMENTS

CA    2459507 A1    9/2004
CN    1620573 A1    5/2005
(Continued)

OTHER PUBLICATIONS

Office Action dated Feb. 14, 2017 in corresponding JP Application No. 2013-167075.
(Continued)

*Primary Examiner* — Eric Keasel
*Assistant Examiner* — David Deal
(74) *Attorney, Agent, or Firm* — Knobbe, Martens, Olson & Bear, LLP (57) ABSTRACT

An outer casing for a control cable 10 has an inner tube 12, which includes a crystalline resin, and an outer tube 14, which includes an outer resin layer 16 covering the outer periphery of the inner tube and, in the outer resin layer, includes plural metal wires 18 buried in parallel with the axial direction of the inner tube and at equal intervals in the circumferential direction of the inner tube.

20 Claims, 5 Drawing Sheets

(52) U.S. Cl.
CPC ...... *F16C 2208/70* (2013.01); *F16C 2240/06* (2013.01); *F16C 2240/60* (2013.01)

(58) Field of Classification Search
USPC .............. 138/137, 140, 141, 145, 153, 174, 138/DIG. 7, 104, 108
See application file for complete search history.

(56) References Cited

U.S. PATENT DOCUMENTS

| | | | |
|---|---|---|---|
| 5,245,887 A | 9/1993 | Tanaka et al. | |
| 6,305,427 B1* | 10/2001 | Priest, II | F16L 11/12 138/104 |
| 7,285,333 B2* | 10/2007 | Wideman | B32B 1/08 428/35.9 |
| 7,315,666 B2* | 1/2008 | Van Der Spek | E21B 47/01 385/12 |
| 8,162,535 B2* | 4/2012 | Glombitza | F16L 55/165 374/120 |
| 8,280,209 B2* | 10/2012 | Bollinger, Jr. | G02B 6/4459 385/106 |
| 8,497,425 B2* | 7/2013 | Morrow | B29C 47/8895 138/104 |
| 2003/0094298 A1* | 5/2003 | Morrow | B29C 47/0023 174/505 |
| 2005/0274425 A1* | 12/2005 | Ostrander | F16L 11/121 138/144 |

FOREIGN PATENT DOCUMENTS

| | | |
|---|---|---|
| JP | S47-011410 A | 6/1972 |
| JP | S50-084665 | 7/1975 |
| JP | S59-016726 A | 1/1984 |
| JP | S59-022322 U | 2/1984 |
| JP | S59-121216 A | 7/1984 |
| JP | S62-113908 A | 5/1987 |
| JP | H01-092515 U | 6/1989 |
| JP | H03-039618 U | 4/1991 |
| JP | H05-001712 | 1/1993 |
| JP | 2002-286017 A | 10/2002 |
| JP | 2011-099524 A | 5/2011 |
| JP | 2013-019493 | 1/2013 |

OTHER PUBLICATIONS

Office Action dated Jun. 1, 2017 in corresponding Chinese Patent Application No. 201480044805.4.

\* cited by examiner

OUTER CASING FOR CONTROL CABLE, METHOD OF MANUFACTURING THE SAME, AND CONTROL CABLE

CROSS-REFERENCE TO RELATED APPLICATIONS

This application is the U.S. National Phase under 35. U.S.C. § 371 of International Application PCT/JP2014/071092, filed Aug. 8, 2014, which claims priority to Japanese Patent Application No. 2013-167075, filed Aug. 9, 2013. The disclosures of the above-described applications are hereby incorporated by reference in their entirety.

TECHNICAL FIELD

The present invention relates to an outer casing for a control cable used in vehicles or the like and a method of manufacturing the same, and further relates to a control cable.

BACKGROUND ART

A typical control cable is formed by a flexible pipe-shaped outer casing and an inner cable made of a metal wire, with the inner cable being inserted through the outer casing. The control cable has a remote control function by pushing, pulling, or rotating one end of the control cable to realize remote control of a passive type device disposed at the other end of the control cable. For example, the control cable may be used in a vehicle for various purposes, such as an open/close cable for a sunroof, an open/close cable for windows, or a cable for the parking break.

For an outer casing of the control cable, dimensional stability in a longitudinal direction is strictly required. Since the inner cable is a metal wire, a linear expansion coefficient and a compression characteristic equivalent to those of the metal wire are required.

If thermal expansion of the outer casing is large, the inner cable acts as if pulled even when the inner cable is not operated. This may cause a malfunction such as failure to close an oil supply port. If the outer casing is soft, the length of the outer casing may be compressed and shortened by operation of the inner cable. In such a case, the control cable may be inoperable even when the inner cable is pulled.

Such things can be confirmed by measuring a thermal expansion and stroke loss (play of the inner cable that causes malfunction if it is too large) of resin of the outer casing. Specifically, stroke loss is measured by measuring stroke values relative to a load acted on the inner cable by changing temperatures. A lower value of stroke loss is preferable.

The outer casing made of resin tends to generate problems as described above. A tubular body, therefore, that is formed by tightly winding a flat steel wire around the outer periphery of an inner tube (liner) made of resin in a spiral manner, with the outer side of the tubular body further covered by resin has conventionally been used (see Japanese Patent Application Laid-Open No. 2002-286017, for example).

However, such an outer casing around which the flat steel wire is spirally and tightly wound is heavy, and does not satisfy lightweight requirement in the recent trend of electric vehicles or hybrid vehicles.

Meanwhile, an outer casing in which a metal wire is linearly buried in a resin layer has been proposed (see JP-A Nos. S47-11410, S59-16726, and 2011-99524, and Japanese Utility Model Application Laid-Open No. 59-22322, for example).

For example, an outer casing for a control cable in which a reinforcing wire, in which flat portions are formed by pressing a metal tube at appropriate intervals, is buried in parallel with an axial center of the casing body in the thickness of the tubular casing body made of synthetic resin has been proposed (see JP-U No. S59-22322).

A method of manufacturing an outer casing by introducing a metal wire into an extruder and burying the metal wire in a thickness part of the tubular conduit made of resin has also been proposed (see JP-A No. S59-16726, for example).

A control cable used in a drain plug remote operation apparatus, which has an outer casing including two metal wires buried in a cylindrical body made of polyolefin-based thermoplastic elastomer in parallel with the axis of the body and opposing from each other by 180 degrees about the axis has also been proposed (see JP-A 2011-99524).

SUMMARY OF INVENTION

Technical Problem

When it is desired to produce an outer casing with a metal wire linearly buried in a thickness part of a tubular body made of resin, the metal wire is introduced into the die of an extruder to extrude the resin in a tubular shape, and the obtained tubular body is passed through an outer diameter adjusting apparatus (former) in which a vacuum apparatus is provided to adjust inner and outer diameters. However, such adjustment is difficult and takes a long time, and increases the amount of waste materials.

The resin to be used is limited to a rigid resin, such as polypropylene. Other resins, such as a soft thermoplastic elastomer and soft vinyl chloride are difficult to be controlled, because such resins may bulge in the vacuum apparatus during adjustment of the outer diameter.

It is an object of the invention to provide an outer casing for a control cable which has a low thermal expansion, is lightweight, and can be manufactured easily, a method of manufacturing such an outer casing, and a control cable.

Solution to Problem

To achieve the above object, the invention is provided as described below.

A first aspect of the invention is an outer casing for a control cable, the outer casing including an inner tube, which includes a crystalline resin, and an outer tube, which includes an outer resin layer covering an outer periphery of the inner tube and, in the outer resin layer, includes a plurality of metal wires buried in parallel with an axial direction of the inner tube and at equal intervals in a circumferential direction of the inner tube.

A second aspect of the present invention is the outer casing for a control cable according to the first aspect, in which the crystalline resin included in the inner tube has a melting point of 120° C. or higher.

A third aspect of the invention is the outer casing for a control cable according to the first or second aspect, in which a resin included in the outer resin layer is a thermoplastic elastomer or soft vinyl chloride.

A fourth aspect of the invention is the outer casing for a control cable according to any one of the first to third aspects, in which at least one of a contact surface between the inner tube and the outer resin layer or a contact surface between the metal wires and the outer resin layer has been subjected to easy adhesion treatment.

A fifth aspect of the invention is a method of manufacturing an outer casing for a control cable, the method including a step of forming an outer tube including an outer resin layer and a plurality of metal wires buried in the outer resin layer by inserting, into a die of an extrusion forming machine, an inner tube including a crystalline resin inserting, together with the plurality of metal wires in parallel with an axial direction of the inner tube and at equal intervals in a circumferential direction of the inner tube, and extruding a resin around an outer periphery of the inner tube while feeding out the inner tube and the plurality of metal wires from the die.

A sixth aspect of the present invention is a control cable including the outer casing for a control cable according to any one of the first to fourth aspects, and an inner cable inserted into the outer casing for a control cable.

Advantageous Effects of Invention

According to the first aspect of the invention, an outer casing for a control cable, which is easy to route, has low thermal expansion, is lightweight, and is easy to produce, is provided.

According to the second aspect of the invention, an outer casing for a control cable having yet further increased slidability relative to the inner cable is provided.

According to the third aspect of the invention, an outer casing for a control cable capable of further improving routing properties is provided.

According to the fourth aspect of the invention, an outer casing for a control cable capable of restricting slipping movement between members and increasing anti-compression force to further decrease stroke loss, is provided.

According to the fifth aspect of the invention, a method of manufacturing an outer casing for a control cable, capable of easily manufacturing an outer casing for a control cable, which is easy to route, has low thermal compression, and is lightweight, is provided.

According to the six aspect of the invention, a control cable that is easy to route, has low thermal expansion, and is lightweight, is provided.

DESCRIPTION OF EMBODIMENTS

An outer casing for a control cable (which may simply be referred to as an "outer casing" hereinafter) and a control cable according to the invention will be described in detail below by referring to the accompanying drawings.
<Outer Casing for Control Cable>

An outer casing for a control cable of the invention includes an inner tube, which includes a crystalline resin, and an outer tube, which includes an outer resin layer covering the outer periphery of the inner tube and, in outer resin layer, includes plural metal wires buried in parallel with the axial direction of the inner tube and at equal intervals in the circumferential direction of the inner tube.

The outer casing of the present invention has a two-layered structure in which the outer tube the inner tube (liner) made of the crystalline resin is inserted into the inside of the outer tube including the plural metal wires buried in parallel with the axial direction and at equal intervals in the circumferential direction in the outer resin layer. With such a structure, extrusion molding can be executed with very high productivity, and measurements of inner and outer diameters can be provided at high accuracy.

In addition, routing is easy for such an outer casing having the above structure, because the outer casing exhibits an excellent dimensional accuracy even when a soft resin is used for the outer resin layer. Both slidability and routing properties, which cannot be realized in a single-layer outer casing, can therefore be realized.

The outer casing of the invention is configured as a combination of the inner tube made of the crystalline resin and the outer tube with plural metal wires linearly buried in the outer resin layer. Therefore, the outer casing is lightweight, easy to route, and is difficult to thermally expand at a wide range of temperatures and has a favorable compression resistance, and thus has low stroke loss. The outer casing of the invention is largely lightweight, having more excellent performance, and can be produced more easily, compared to a conventional outer casing formed by tightly winding a flat steel wire or a round steel wire around the inner resin tube spirally and covering the outside of the inner resin tube with resin.

Namely, the outer casing of the invention satisfies requirement of performances as the control cable in routing properties, stroke loss, and load efficiency. In addition, the outer casing of the invention is easy to manufacture, and thus easy to keep a certain quality level.

Figure 1:
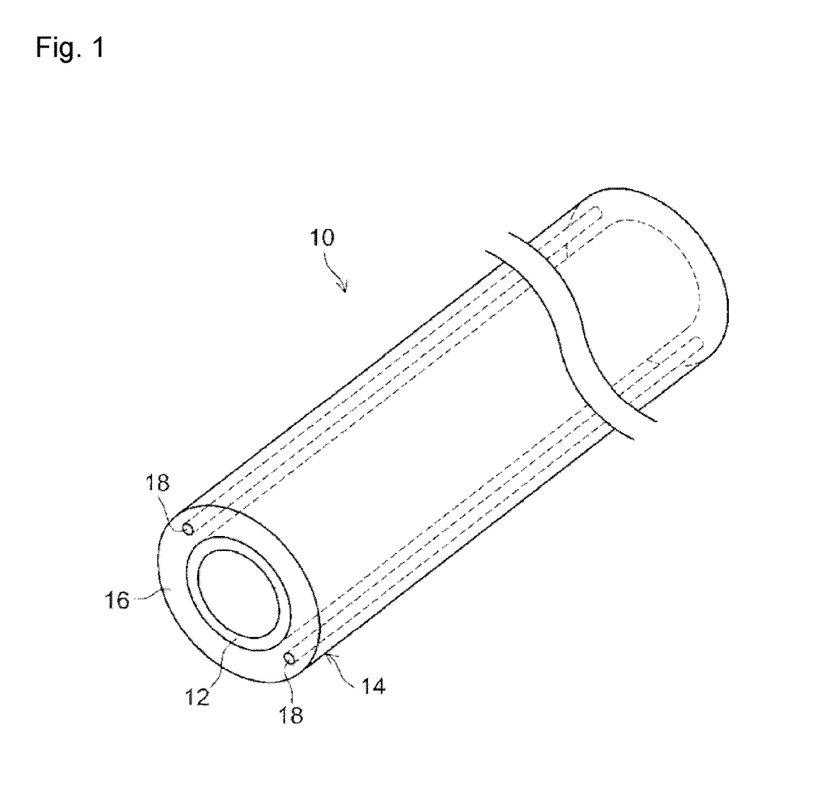
FIG. 1 is a schematic view showing an exemplary structure of an outer casing for a control cable of the invention.

FIG. 1 schematically shows an exemplary structure of the outer casing for a control cable according to an embodiment of the invention. An outer casing 10 according to the invention is formed by an inner tube 12 including a crystalline resin and an outer tube 14 including an outer resin layer 16 covering the outer periphery of the inner tube 12 and two metal wires 18 buried in parallel with each other in the axial direction of the inner tube 12 and at equal intervals (at positions symmetrical about the axis) in the circumferential direction of the inner tube 12 in the outer resin layer 16. Constituent members will be described hereinafter.

(Inner Tube)

An inner tube 12 (may be referred to as a "resin liner" or a "liner" hereinafter) includes the crystalline resin.

A melting point of the crystalline resin forming the liner 12 is preferably in a range equal to or higher than 120° C. The liner 12 formed with the crystalline resin having the melting point in this range has a high slidability relative to an inner cable (not shown). In addition, when the resin to form an outer resin layer 16 is extruded at high temperature around the outer peripheral surface of the liner 12 to cover the liner 12 in manufacturing, the fusing or deforming of the liner 12 is restricted.

For example, even when a high density polyethylene which has a relatively low melting point (melting point of 135° C.) is used as the crystalline resin, the liner 12 is hardly deformed during extrusion molding of the outer resin layer 16. If a crystalline resin having a higher melting point is used, deformation is further restricted.

An upper limit of the melting point of the crystalline resin forming the liner 12 is preferably about 265° C. Molding is easy if the melting point is not more than 265° C., as the extrusion can be carried out at a relatively low temperature.

If the resin that forms the liner 12 is amorphous resin, even when a very hard resin, such as polycarbonate, is used, or grease is injected in the inner peripheral surface of the liner, the slidability of the liner 12 relative to the inner cable is deteriorated and the function as a control cable is greatly decreased.

Examples of the crystalline resins to form the liner 12 include nylon 66 (melting point of 260 degrees), nylon 6 (melting point of 220 degrees), polybutylene terephthalate (melting point of 220 degrees), polyoxymethylene (melting point of from 165 to 175 degrees), polymethylpentene (melting point of 230 degrees), polypropylene (melting point of 165 degrees), and high density polyethylene (melting point of 135 degrees). These resins are preferable because friction coefficients are low and load efficiencies are high. In particular, a high load efficiency is easily obtained by using polybutylene phthalate, polyoxymethylene, or high density polyethylene.

The thickness of the liner 12 is preferably from 50 to 1,000 μm, and is particularly preferably from 100 to 500 μm, in order to minimize damage caused by heat when the outer resin layer 16 is extruded to cover the outer peripheral surface of the liner.

(Outer Tube)

An outer tube 14 (may also be referred to as an "outer") includes the outer resin layer 16 (outer resin) covering the outer periphery of the inner tube 12, and the two metal wires 18 buried in parallel with the axial direction of the inner tube 12 and at equal intervals in the circumferential direction of the inner tube 12 in the outer resin layer 16.

—Outer Resin Layer—

The resin included in the outer resin layer 16 may be a crystalline resin or an amorphous resin. Preferably, the resin has a storage elastic modulus according to dynamic viscoelasticity of not more than 3,000 MPa because such a resin is easy to bend. The resin having a storage elastic modulus of not more than 1,500 MPa is particularly preferable because such a resin is easier to bend.

In the present embodiment, the storage elastic modulus is a value measured at 25° C. among values measured by a dynamic viscoelasticity measuring device in a tension mode at 1 Hz frequency and a temperature increasing speed of 2° C./minute.

A melting point or a glass transition point (Tg) of the resin included in the outer resin layer 16 is preferably not more than 210° C., and more preferably not more than 180° C.

If the resin having the melting point or the glass transition point (in the case of the amorphous resin) of not more than 210° C., the liner 12 is unlikely to be damaged when the resin is extruded into the outer peripheral surface of the liner 12 to cover the liner 12.

A difference between the melting point (T1) of the crystalline resin forming the liner 12 and the melting point or the glass transition point (T2) of the resin forming the outer resin layer 16, i.e., ΔT=(T1−T2), is preferably in a range of from −50 to +130° C. The manufacture is easier as ΔT becomes larger in the positive range.

Examples of resins that can be applied to form the outer resin layer 16 include soft vinyl chloride, a polyethylene-based resin, a polypropylene-based resin, polyoxymethylene, thermoplastic elastomers, such as a styrene-based thermoplastic elastomer, an urethane-based thermoplastic elastomer, an ester-based thermoplastic elastomer, and a polyethylene-based thermoplastic elastomer, or an olefin-based thermoplastic elastomer in which EPDM (ethylene-propylene-diene rubber) or ethylene propylene copolymer is dispersed may also be used.

Examples of polyethylene-based resins include high density polyethylene, linear chain low density polyethylene, and low density polyethylene. The most preferable resin is high density polyethylene. High density polyethylene has a density of from 0.941 to 0.970 and is a resin with high crystallinity among polyethylenes, and thus has excellent heat resistance and chemical resistance.

Examples of the polypropylene-based resins include a block or random copolymer polypropylene, in addition to a homo polypropylene.

Among these resins, the soft vinyl chloride or the thermoplastic elastomer is preferable, as such resins are soft and thus routing properties may be improved by using the resin.

When a crystalline resin such as a polyethylene-based resin, a polypropylene-based resin, or polyoxymethylene is used as the outer resin layer 16, the outer resin layer 16 fits closely (bonds tightly) to the inner tube 12, as the outer resin layer 16 has a large mold shrinkage factor. As a result, slipping movement between the inner tube 12 and the outer tube 14 (outer resin layer 16) is restricted even when the inner tube 12 and the outer resin layer 16 are not bonded with each other.

The inner tube 12 and the outer tube 14 can be strongly bonded with each other by easy adhesion treatment, which is described below, such as plasma irradiation or primer treatment, on the outer peripheral surface of the inner tube 12, regardless of the material of the outer resin layer 16.

The thickness of the outer resin layer 16 is preferably from 0.2 to 2.0 mm, and more preferably from 0.3 to 1.5 mm, from the viewpoint of the strength of the control cable, and in view of the relationship to the diameter of the metal wire 18 and to thermal damage to the liner 12.

—Metal Wire—

Two metal wires 18 are buried in the outer resin layer 16 in parallel with the axial direction of the inner tube 12 and at equal intervals in the circumferential direction of the inner tube 12.

Examples of the metal wires 18 buried in the outer resin layer 16 may include a hard steel wire, a soft steel wire, a stainless steel wire, and the like. A diameter of the metal wire 18 is preferably from about 0.1 to 0.5 mm.

A stranded wire made by stranding one to five metal wires having a wire diameter of from 0.05 to 0.2 mm may preferably be used since the flexibility of an obtained outer casing 10 is increased.

The metal wire 18 may be provided with irregularities intermittently in the longitudinal direction of the metal wire 18. In this case, the irregularities would enter the resin of the outer resin layer 16 to suppress the slipping movement of the metal wire 18. As a result, protrusion of the metal wire 18 is effectively suppressed when the outer casing or the control cable is bent.

Such irregularities can be formed, for example, by roll pressing of the metal wire 18.

The metal wire 18 and the resin become a kind of metal fiber reinforcing resin, such that the thermal expansion is halved compared to a case in which the metal wires 18 are not buried, and the compression strength and the tensile strength, particularly at high temperature, are greatly improved.

When the outer resin layer 16 is made of a soft resin, such as soft vinyl chloride or a thermoplastic elastomer, the resin enters the irregularities of the metal wire 18 only weakly, and the metal wire 18 easily protrudes from end terminals of the outer resin layer 16 by bending. If the resin is shifted from the metal wire 18, a reinforcing effect by the metal wire 18 is easily decreased.

To treat this, the metal wire 18 may be subjected to easy adhesion treatment to increase adhesiveness with the resin and restrict the slipping movement of the metal wire 18. The easy adhesion treatment is very effective when the soft resin is used as the outer resin layer 16, but is also effective when the hard resin is used. The effect of the easy adhesion treatment may increase further by increasing a surface area of the metal wires 18, such as by providing the irregularities in the metal wires 18, using the stranded wire, or the like.

Figure 2:
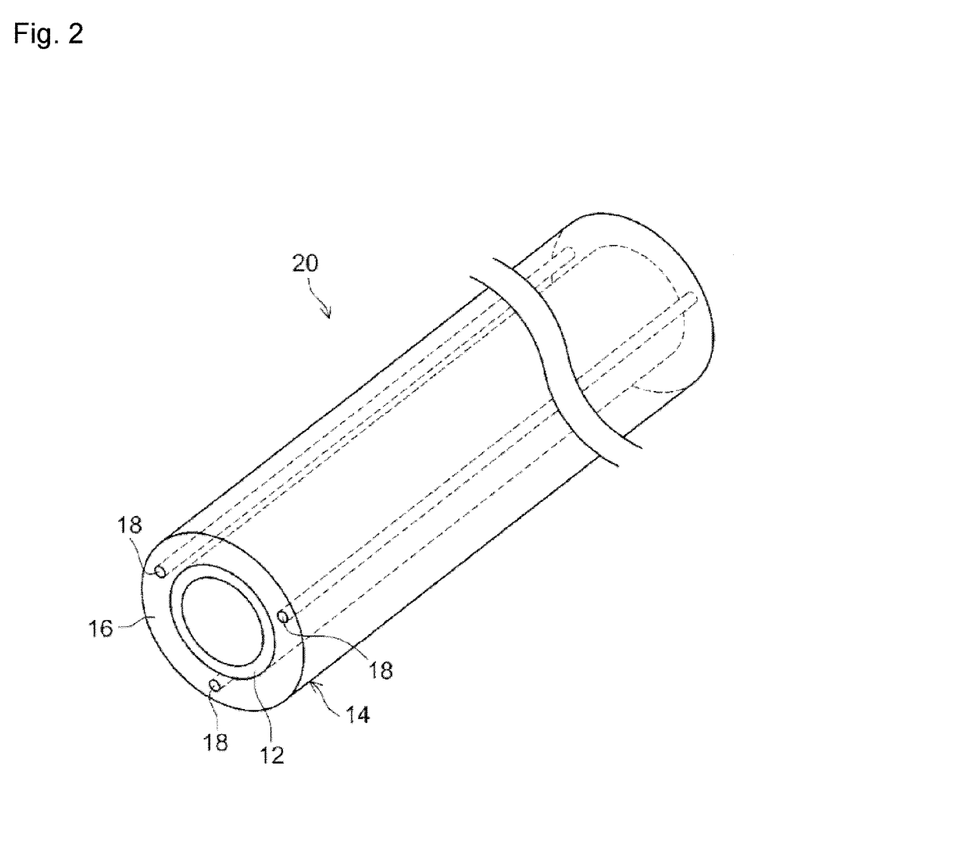
FIG. 2 is a schematic view showing another exemplary structure of an outer casing for a control cable of the invention.

The outer casing 10 shown in FIG. 1 includes two metal wires 18 buried in the outer resin layer 16 in parallel along the axial direction of the inner tube 12 and at positions symmetrical about the axis, but the metal wires 18 are not limited to two metal wires. For example, as shown in FIG. 2, the control cable 20 may include the three metal wires 18 buried in parallel with the axial direction of the inner tube 12 and at equal intervals in the circumferential direction of the inner tube 12. The number of the metal wires is preferably three or less, because it becomes difficult to bend the metal wires as the number of the metal wires increases.

In the present embodiment, "in parallel with the axial direction of the inner tube" in regard to the metal wires 18 does not mean that when the outer casing is configured linearly, an angle between the metal wires 18 is limited to 0 degrees, and the angle may change intermittently within 10 degrees. In addition, "at equal intervals in the circumferential direction of the inner tube" does not mean that the intervals of the plural metal wires 18 buried in the outer resin layer 16 in the circumferential direction of the inner tube 12 are limited to be exactly equal, and the intervals may be different from each other by 10%.

<Method of Manufacturing Outer Casing for Control Cable>

A method of manufacturing the outer casing 10 according to the present embodiment is not particularly limited. For example, the inner tube 12 made of the crystalline resin may be inserted inside the outer tube 14 with the plural metal wires 18 buried in the outer resin layer 16. In contrast, it is preferable that, after the inner tube 12 is formed, the outer resin layer 16 is extruded and molded on the outer periphery of the inner tube 12, so as to cover the inner tube 12 with the outer tube 14 in which the plural metal wires 18 are buried in the outer resin layer 16 in parallel with and at equal intervals with each other.

Namely, the outer casing according to the embodiment can be manufactured preferably by inserting, into a die of an extrusion forming machine, the inner tube including the crystalline resin and the plural metal wires in parallel with the axial direction of the inner tube and at equal intervals in the circumferential direction of the inner tube and by extruding a resin around the outer periphery of the inner tube while feeding out the inner tube and the plural metal wires from the die to form the outer tube including the outer resin layer and the plural metal wires buried in the outer resin layer.

Figure 3:
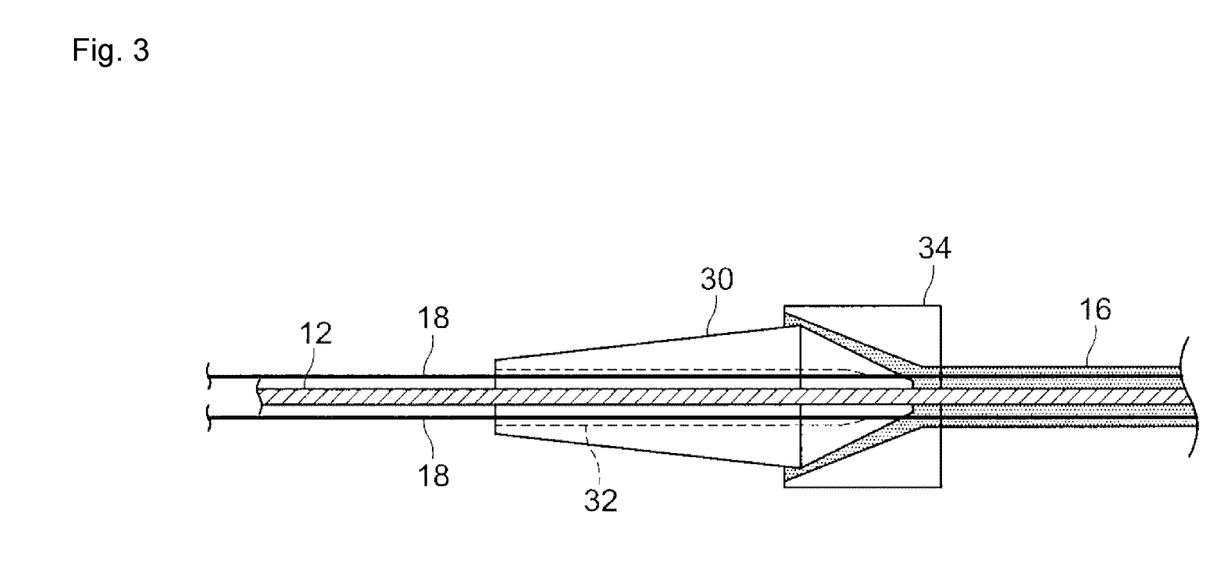
FIG. 3 is a schematic view showing a step to form an outer tube around an outer periphery of an inner tube when an outer casing for a control cable is manufactured.

FIG. 3 schematically shows a part of the manufacturing steps of the control cable according to the present embodiment. For example, the resin liner 12 may be manufactured in advance, or two extruders are provided such that one extruder is used to manufacture the resin liner 12, and two metal wires 18 and the liner 12 are inserted into the other extruder from an insertion hole 32 of a nozzle 30 located behind the die 34 of the extruder. At this time, the two metal wires 18 are inserted in parallel with the axial direction of the liner 12 and at equal intervals in the circumferential direction (i.e., symmetrical about the axis) of the liner 12. The resin liner 12 and the metal wires 18 are introduced into the die 34, and a resin tube (outer resin layer 16) is extruded to cover the outer peripheral surface of the liner 12 while being fed from the die 34. Thus, the two metal wires 18 are buried in the thickness of the resin tube 16 in parallel with the longitudinal direction of the resin tube 16 and at positions approximately symmetrical with each other.

The resin tube covered as the outer resin layer 16 (outer resin) around the outer peripheral surface of the resin liner 12 has a favorable dimensional accuracy of inner and outer diameters, and does not need to be passed through an outer diameter adjusting apparatus provided with a vacuum apparatus (a former: an apparatus for controlling the outer diameter by suctioning the outer surface of an extruded tubular body).

When the outer casing 10 according to the embodiment is manufactured as described above, it is preferable to treat at least one contact surface of a contact surface between the inner tube (liner) 12 and the outer resin layer 16, or a contact surface between the metal wires 18 and the outer resin layer 16, with the easy adhesion treatment.

The easy adhesion treatment in the invention may be oxidation treatment, such as corona discharge or plasma irradiation, or primer treatment.

If, for example, the liner is made of high density polyethylene or polyoxymethylene that has poor adhesiveness with the soft vinyl chloride and the outer peripheral surface of the liner is covered by the soft vinyl chloride, the outer resin layer is not adhered to the liner. However, if the outer peripheral surface of the liner is subjected to the corona discharge or the plasma treatment, adhesiveness between the soft vinyl chloride and the liner significantly increases, whereby the inner tube 12 and outer tube 14 become integrated, and a high adhesiveness is kept against compression.

Adhesiveness of the metal wires and the resin is usually low. For example, if a polypropylene-based elastomer is used for the outer resin layer 16, an obtained outer casing has an excellent flexibility, but the metal wires 18 may slip in the outer resin layer 16 due to repeated bending and thus the metal wires 18 may protrude from the outer resin layer 16.

However, by applying primer to the surface of the metal wires 18, adhesiveness between the resin and the metal greatly increases and protrusion of the metal wires 18 can be prevented effectively regardless of bending.

Exemplary types of the primer include: a resin solution (MAO) of polyolefin treated with polar group, such as maleic anhydride, a copolymer of an epoxy group-containing monomer, such as glycidyl acrylate (GMP), chlorinated polyolefin (CPE), chlorinated ethylene-vinyl acetate copolymer (CEVA), and further aqueous or solvent dispersion of olefin resin particles (PO emulsion). These primers can improve adhesiveness between resin and metal, or between different types of resins. It is more effective to use the primer with plasma irradiation or corona discharge.

In a conventional method of manufacturing a single-layer outer casing that has generally been used, the metal wire is introduced into the extruding die and buried in a resin tube, and the inner and outer diameters are adjusted and determined simultaneously. Such a method, however, involves complicated operations and requires a long time, and eventually discharges a large amount of resin and metal waste materials. Further, such an outer casing becomes elliptical because diameters are different between a portion where the metal wire is present and a portion where the metal wire is not present. It is necessary, therefore, to make the inner diameter relatively large. Otherwise the load efficiency may be deteriorated.

In contrast, in the two-layered outer casing of the embodiment, it is not necessary to control the inner diameter, which is the most important portion for the outer casing, with high accuracy in order to cover the outer periphery of the liner made of crystalline resin made in advance or previously into a tubular shape with resin.

In the conventional single-layer outer casing, the resin was selected by considering sliding ability, and a hard resin was usually selected. As a result of this, the routing properties had to be sacrificed. However, in the outer casing having the two-layered structure of the invention, since it is possible to select the liner by considering the sliding ability, and select the outer resin layer by considering the routing properties, a well-balanced outer casing can be provided.

The outer periphery of the outer casing having the two-layered structure of the invention may be covered by a cylindrical protector or foamed body for purposes such as oil proofing, heat resistance, vibration proofing, and hammering noise prevention.

<Control Cable>

The control cable of the invention includes the outer casing according to the invention as described above and an inner cable inserted into the outer casing (inner tube).

A metal wire may be used as an inner cable, and should be selected in accordance with the required strength or the like.

The metal wire may be coated with resin, such as nylon, for the rustproof purpose.

Grease may be injected into an insertion hole of the outer casing to improve the slidability.

The control cable of the invention is not limited to a specific use, and may be used in various uses, such as a sunroof open/close cable, a seat cable, a window open/close cable, a parking break cable, a trunk opening cable, a fuel opening cable, a bonnet cable, a key lock cable, a heater adjusting cable, an automatic transmission cable, an a throttle cable, or an accelerator cable.

EXAMPLES

Examples of the invention will be described below, but the invention is not limited to such examples.

First, materials and treatment details used in the examples and comparative examples are described below.

The storage elastic modulus listed in used resins was measured by using a dynamic viscoelasticity measuring device (manufactured by TA Instruments) at a temperature increasing speed of 2° C./minute and a frequency of 1 hz in a tension mode.

(Resin)

Resin PE: HI-ZEX 500H (high density polyethylene, MFR: 0.10, density: 0.958, storage elastic modulus: 1300 MPa, melting point: 132° C., manufactured by PRIME POLYMER).

Resin POM: Iupital F10 (polyoxymethylene, density: 1.41, storage elastic modulus: 2800 MPa, melting point: 160° C., manufactured by Mitsubishi Engineering-Plastics Corporation).

Resin PBT: NOVADURAN 5010Trxa (polybutylene terephthalate, density: 1.27, storage elastic modulus: 2400 MPa, melting point: 220° C., manufactured by Mitsubishi Engineering-Plastics Corporation).

Resin PC: Iupilon E2000 (polycarbonate (amorphous resin)), density: 1.20, storage elastic modulus: 2300 MPa, glass transition point: 150° C., manufactured by Mitsubishi Engineering-Plastics Corporation).

Resin TPO: MILASTOMER M4400B (polypropylene-based thermoplastic elastomer resin, MFR: not more than 1, density: 0.89, storage elastic modulus: 410 MPa, melting point: 150° C., manufactured by Mitsui Chemicals, Inc.).

Resin PP: Prime Polypro E105GM (MFR: 0.5, density: 0.89, storage elastic modulus: 960 MPa, melting point: 162° C., manufactured by PRIME POLYMER).

Resin PVC1: VINIKA CE85E (soft vinyl chloride (amorphous resin), A hardness: 83, density: 1.44, glass transition point: 22° C., manufactured by Mitsubishi Chemical Corporation).

Resin PVC2: VINIKA T-620 (hard vinyl chloride (amorphous resin), D hardness: 90, density: 1.41, glass transition point: 100° C., manufactured by Mitsubishi Chemical Corporation).

LLDPE: linear low density polyethylene, SUMICASEN E FV102 (MFR: 0.8, density: 0.926, melting point: 125° C., storage elastic modulus: 440 MPa, manufactured by Sumitomo Chemical Co., Ltd.).

LDPE: low density polyethylene, Sumikathene F218-0 (MFR: 1.0, density: 0.919, melting point: 109° C., storage elastic modulus: 115 MPa, manufactured by Sumitomo Chemical Co. Ltd.).

(Metal Wire)

Hard steel wire: a heat-treated metal wire having a diameter of 0.33 mm.

Stranded wire: a metal wire stranded by three hard steel wires each having a diameter of 0.15 mm at 2 mm pitch.

(Easy Adhesion Treatment)

Plasma irradiation: A material (resin liner) was subject to plasma irradiation at a speed of 100 mm per second by the Real Plasma APG-500 manufactured by KASUGA ELECTRIC WORKS LTD.

Primer: The metal wire was immersed in UNISTOLE R300 (organic solvent solution of acid-modified polypropylene manufactured by Mitsui Chemicals Inc.) for 0.5 minute and dried at 150° C. for two minutes before use.

Example 1

(Manufacture of Resin Liner)

Pellets of the resin PE were fed into a single-screw extruder (manufactured by SOKEN) having a screw diameter of 30 mm, a length-diameter ratio (L/D)=22 to sequentially extrude tubular molded products each having 2.0 mm inner diameter and 2.8 mm outer diameter at a screw temperature of 200° C. Immediately after the extrusion, the outer diameter was adjusted by a former to obtain a resin liner (inner tube).

(Manufacture of Two-layered Outer Casing)

The resin liner previously manufactured as described above was inserted into a cross-head type single-screw extruder (manufactured by the Japan Steel Works, Ltd.), which has a screw diameter of 30 mm and the ratio of length to diameter (L/D)=30, from the rear part of the die.

Meanwhile, pellets of the resin PP were fed to the single-screw extruder, and while the outer periphery of the resin liner was covered by the resin PP at a screw temperature of 210° C. to form the outer resin layer, two hard steel wires were introduced into the die, and then molded by extrusion in such a manner that the two hard steel wires were buried in the longitudinal direction and in parallel and symmetrical positions in the middle portion of the thickness of the outer resin layer (distance between the metal wires is 3.5 mm). As a result of this, an outer casing having a two-layered structure and an outer diameter of 5 mm was obtained.

[Evaluation]

An inner cable (SWRH62A manufactured by UNIFLEX CO., LTD., diameter: 1.5 mm) was inserted into the obtained outer casing to produce a control cable.

The outer casing and the control cable were evaluated as described below.

(Stroke Loss)

Figure 4:
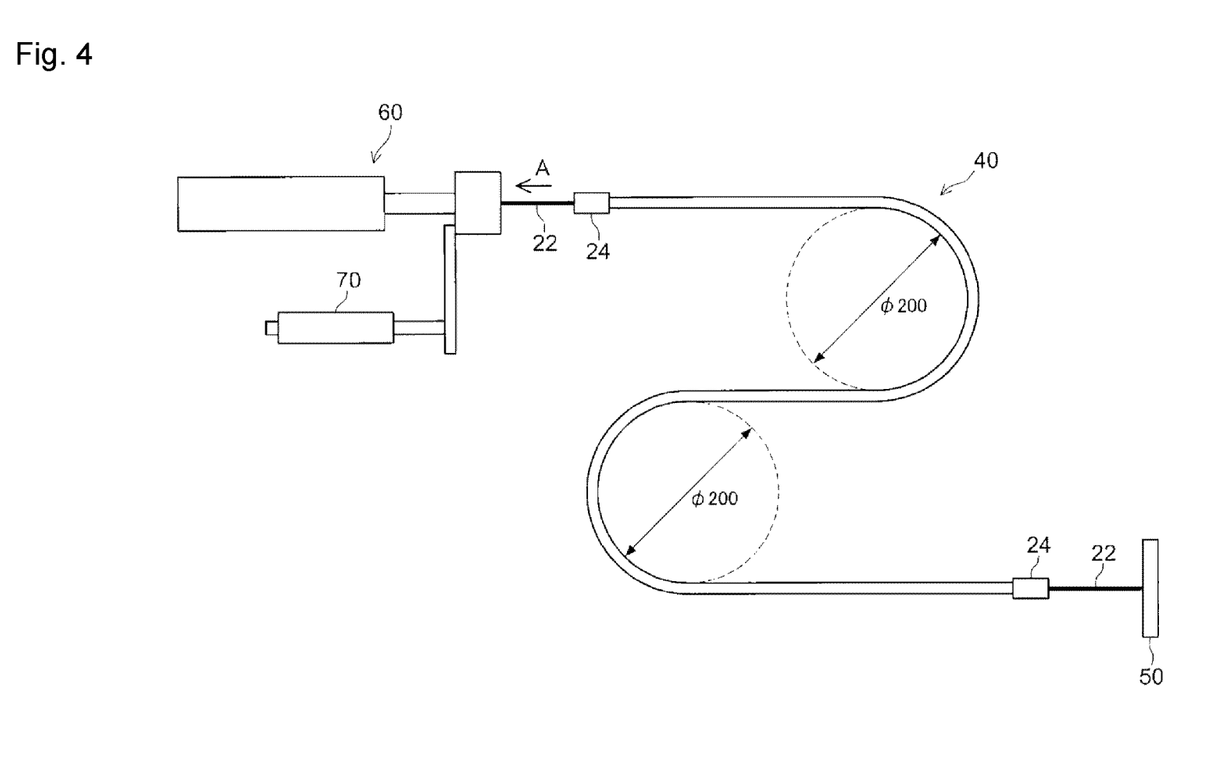
FIG. 4 is a schematic view for explaining how stroke loss is measured.

FIG. 4 is a schematic view for explaining how stroke loss is measured. A control cable 40 having a length of 1.5 m was routed in a reverse S-shape having a diameter of 200 mm, as shown in FIG. 4. Metal fittings 24 fitted to both ends of the outer casing were fixed, and one end of the inner cable 22 was fixed to the fitting member 50. In this state, the other end of the inner cable 22 was held by a tensile testing machine 60, and pulled in the direction of arrow A at 80° C. and with a force of 98 N, and the "tensile length" of the inner cable was measured by a displacement gauge 70 to obtain a stroke loss value.

Meanwhile, a conventional flat-steel-wire winding type control cable was manufactured for measurement, and the obtained stroke loss value was 3.1 mm.

(Load Efficiency)

Figure 5:
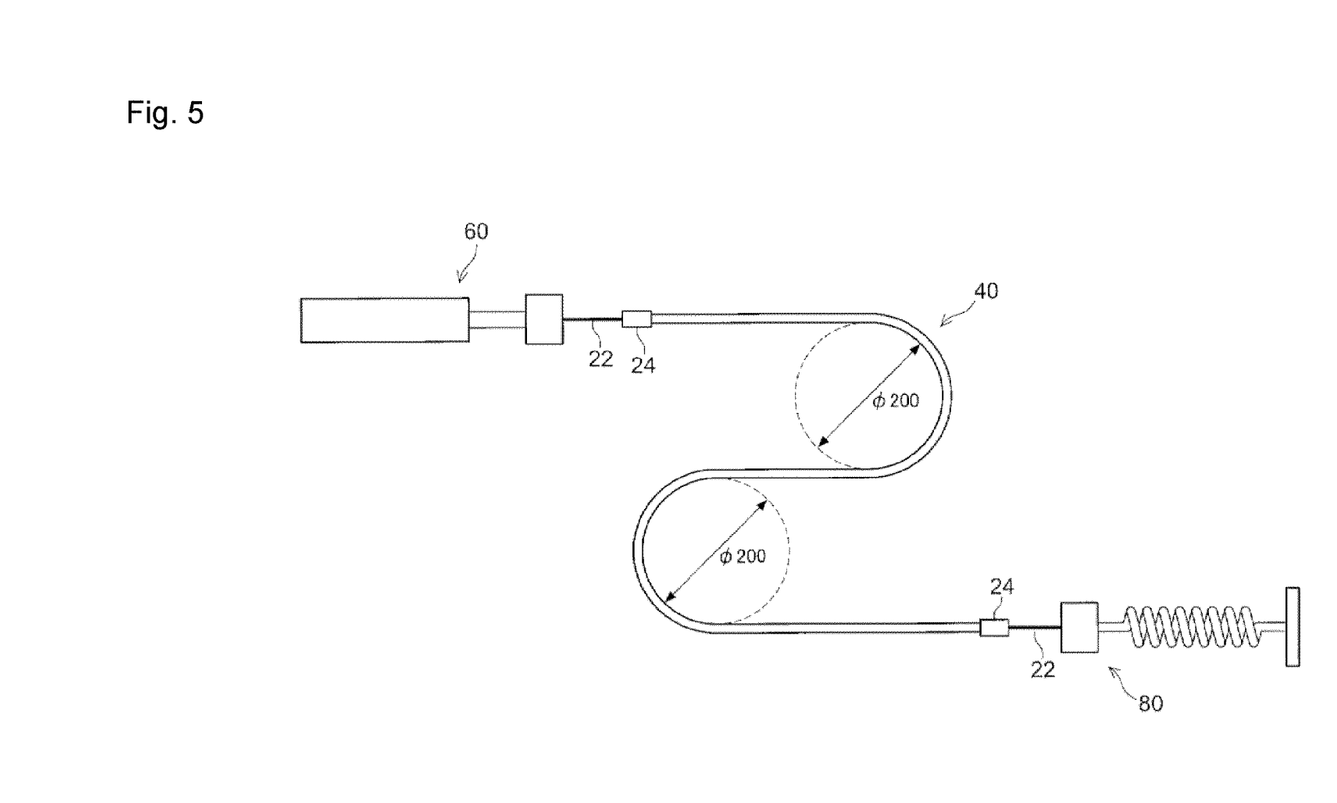
FIG. 5 is a schematic view for explaining how load efficiency is measured.

FIG. 5 is a schematic view for explaining how load efficiency is measured. A control cable having a length of 1.5 m was routed in an R shape having a diameter of 200 mm, and the metal fittings 24 fitted to both ends of the outer casing were fixed. A load meter 80 was attached to one terminal end of the inner cable 22, and the other terminal end of the inner cable 22 was pulled with a force of 98 N at room temperature by the tensile testing machine 60 to measure a load transmitted to the terminal end side. As a result of this, load efficiency was obtained. It is determined that when this ratio increases, the efficiency becomes higher.

(Variation of Inner Diameter)

The inner diameter of outer casing having a length of 3,000 mm was measured by a micrometer at intervals of 500 mm, whereby a difference between the maximum portion and the minimum portion was obtained.

(Thermal Expansion)

After an outer casing having a length of 1,000 mm was left for three hours in an 80° C. atmosphere, a length (L1) was obtained. A difference L1-L0 between the length (L1) and a length (L0) measured at room temperature was measured.

(Routing Properties)

A control cable having a length of 150 mm was fixed at both ends such that the metal wires extended horizontally, and a load (N) was measured when one end of the control cable was bent vertically at a right angle to the longitudinal direction. As this value decreases, the routing properties are improved.

(Protrusion of Metal Wire)

After a control cable having a length of 150 mm was bent at R50, a protruded measurement of the metal wire at the terminal end of the outer casing was measured.

Examples 2 to 7

The outer casing and the control cable were manufactured and evaluated in the same manner as in Example 1 except that the materials and manufacturing conditions listed in Table 1 below replace those of Example 1.

TABLE 1

|  | EXAMPLE 1 | EXAMPLE 2 | EXAMPLE 3 | EXAMPLE 4 | EXAMPLE 5 | EXAMPLE 6 | EXAMPLE 7 |
| --- | --- | --- | --- | --- | --- | --- | --- |
| Type of metal wire | Hard steel wire | Hard steel wire | Hard steel wire | Hard steel wire | Hard steel wire | Hard steel wire | Stranded wire |
| Liner Type | PE | PE | PE | PE | PE | PE | PE |
| Resin Melting point or Tg (° C.) | 132 | 132 | 132 | 132 | 132 | 132 | 132 |
| Outer Type | PP | PP | TPO | TPO | PVC1 | POM | TPO |
| Resin Melting point or Tg (° C.) | 162 | 162 | 150 | 150 | 22 | 160 | 150 |
| Temperature difference ΔT (° C.) | −30 | −30 | −18 | −18 | 110 | −28 | −18 |
| Easy adhesion treatment | — | Primer to metal wire | — | Primer to metal wire | Primer to metal wire Prasma irradiation to PE | — | Primer to metal wire |
| Use or non-use of former (during molding of outer) | Not used | Not used | Not used | Not used | Not used | Not used | Not used |
| Evaluation item |  |  |  |  |  |  |  |
| Moldability | Good | Good | Good | Good | Good | Good | Good |
| Variation of inner diameter (mm) | <10 | <10 | <10 | <10 | <10 | <10 | <10 |
| Thermal expansion (mm) | 1.9 | 1.8 | 1.9 | 1.8 | 1.7 | 1.8 | 1.9 |
| Routing properties (N) | 7.2 | 7.2 | 4.9 | 5.0 | 4.8 | 8.2 | 3.2 |
| Stroke loss (mm) | 4.0 | 3.8 | 4.1 | 4.0 | 4.0 | 3.5 | 5.6 |
| Load efficiency (%) | 63.4 | 63.4 | 63.4 | 63.4 | 63.4 | 63.4 | 63.4 |
| Protrusion of metal wire (mm) | 1 | 0 | 2 | 0 | 0 | 1 | 0 |
| Weight (g/m) | 16.7 | 16.7 | 16.6 | 16.6 | 24.0 | 23.6 | 16.6 |

Comparative Examples 1 to 3-3

The outer casing and the control cable were manufactured and evaluated in the same manner as in Example 1 except that the materials and manufacturing conditions listed in Table 2 below replace those of Example 1.

TABLE 2

|  |  | COMPARATIVE EXAMPLE 1 | COMPARATIVE EXAMPLE 2-1 | COMPARATIVE EXAMPLE 2-2 | COMPARATIVE EXAMPLE 3-1 | COMPARATIVE EXAMPLE 3-2 | COMPARATIVE EXAMPLE 3-3 |
| --- | --- | --- | --- | --- | --- | --- | --- |
|  | Type of metal wire | Hard steel wire | — | Hard steel wire | — | Hard steel wire | — |
| Liner resin | Type | — | PC | PC | PVC2 | PVC2 | PVC2 |
|  | Melting point or Tg (° C.) | — | 150 | 150 | 100 | 100 | 100 |
| Outer resin | Type | PP | — | PP | — | PE | PE |
|  | Melting point or Tg (° C.) | 162 | — | 162 | — | 132 | 132 |
|  | Temperature difference T (° C.) | — | — | −12 | — | −32 | −32 |
|  | Easy adhesion treatment | — | — | — | — | — | — |
|  | Use or non-use of former (during molding of outer) | Used | — | Not used | — | Not used | Not used |
|  | Evaluation item |  |  |  |  |  |  |
|  | Moldability | Adjustment: large, wasted amount: large | Liner molding failed (did not pass through the former) | Defective dimensions | Liner molding failed (did not pass through the former) | Defective dimensions | Shrunk in longitudinal direction, Deformed as inner and outer diameters are larger than 300 μm |
|  | Variation of inner diameter (μm) | 80 | — | Large (about 80) | — | Large (about 105) | Large (about 200) |
|  | Thermal expansion (mm) | 1.8 | — | 1.7 | — | 2.1 | 9.5 |
|  | Routing properties (N) | 7.8 | — | 10.2 | — | 7.5 | 3.0 |
|  | Stroke loss (mm) | 4.3 | — | 4.0 | — | 6.3 | 40 |
|  | Load efficiency (%) | 51.5 | — | 21.2 | — | 20.3 | 20.5 |
|  | Protrusion of metal wire (mm) | 1 | — | 1 | — | 2 | — |
|  | Weight (g/m) | 16.5 | — | 18.2 | — | 18.7 | 17.0 |

Examples 8 to 10, Comparative Examples 4 to 6

The outer casing and the control cable were manufactured and evaluated in the same manner as in Example 1 except that the materials and manufacturing conditions listed in Table 3 below replace those of Example 1.

TABLE 3

|  |  | EXAMPLE 8 | EXAMPLE 9 | EXAMPLE 10 | COMPARATIVE EXAMPLE 4 | COMPARATIVE EXAMPLE 5 | COMPARATIVE EXAMPLE 6 |
| --- | --- | --- | --- | --- | --- | --- | --- |
|  | Type of metal wire | Stranded wire | Hard steel wire | Hard steel wire | Hard steel wire | — | Flat steel wire winding |
| Liner resin | Type | PBT | LLDPE | LDPE | — | PE | PE |
|  | Melting point or Tg (° C.) | 220 | 125 | 109 | — | 132 | 132 |
| Outer resin | TYPE | TPO | PP | PP | TPO | PP | PP |
|  | Melting point or Tg (° C.) | 150 | 162 | 162 | 150 | 162 | 162 |
|  | Temperature difference ΔT (° C.) | 70 | −37 | −53 | — | −30 | −30 |
|  | Easy adhesion treatment | Primer to metal wire | — | — | — | — | — |
|  | Use or non-use of former (during molding of outer) | Not used | Not used | Not used | Used | Not used | Not used |
|  | Evaluation item |  |  |  |  |  |  |
|  | Moldability | Good | Good | Liner softened Measurements varied | Could not control measurements | Good | Good |
|  | Variation of inner diameter (μm) | <10 | 20 | 40 | — | <10 | <10 |
|  | Thermal expansion (mm) | 1.7 | 2.0 | 2.2 | — | 8.2 | 1.8 |
|  | Routing properties (N) | 3.6 | 7.0 | 6.8 | — | 4.0 | 6.5 |
|  | Stroke loss (mm) | 4.0 | 4.1 | 4.5 | — | 30 | 3.1 |
|  | Load efficiency (%) | 65.2 | 54.3 | 48.5 | — | 63.4 | 63.4 |
|  | Protrusion of metal wire (mm) | 0 | 1 | 1 | — | — | — |
|  | Weight (g/m) | 17.6 | 16.6 | 16.5 | — | 15.0 | 59.7 |
|  | Remarks |  |  |  |  | Unfavorable thermal expansion and stroke loss |  |

Molding of the liner was attempted using polycarbonate (PC: amorphous resin) and a hard vinyl chloride (PVC2: amorphous resin). The molding was failed, because the materials were discharged from the die of the extruder, but were not able to pass through an outer diameter adjusting apparatus (former: an apparatus for controlling the outer diameter by sucking the outer surface of an extruded tubular body) (Comparative Examples 2-1, 3-1).

The reason for this was considered to be that the resistance increased when the amorphous resin passed through the former, as the amorphous resin had a high coefficient of friction (for reference, the coefficient of static friction for steel: PE/0.11, PVC/0.22, and PC/0.36).

Meanwhile, the liner was molded from each of the above-mentioned two types of resins without using the former, but the obtained inner and outer diameter measurements were very poor.

It was attempted that a liner having a poor inner and outer diameter measurement was used and covered by the outer resin. This resulted in increasing the variation of measurements of the liner (Comparative Examples 2-2, 3-2).

A reason for the increased variation of measurements was considered to be that, in addition to the absence of the former to control the outer diameter, the liner resin was heated above the glass transition point and become a rubber-like state, when the amorphous resin liner touched a melted resin at nearly 200° C., whereby the deformation of the liner was facilitated.

This does not happen when the crystalline resin is used as the liner. The reason for this is not apparent but, presumably, in the case of the crystalline resin, since a latent heat of melting of crystal is high, the crystalline resin is cooled before melting of crystal occurs and become solid, such that the deformation can be prevented.

Comparative Example 5 is an example of a two-layered tube in which the metal wires were not buried. Because of the absence of the metal wires, thermal expansion and stroke loss were significantly deteriorated.

Comparative Example 6 is an example of a conventional flat steel wire winding product. It is apparent that the weight of the product is 59.7 g/m, i.e., very heavy.

The disclosure of Japanese Patent Application No. 2013-167075 is incorporated herein by reference in its entirety.

All publications, patents, patent applications, and technical standards mentioned in this description are incorporated herein by reference to the same extent as if each individual publication, patents, patent application, or technical standard was specifically and individually indicated to be incorporated by reference.

What is claimed is:

1. An outer casing for a control cable for vehicles, the outer casing comprising:
    an inner tube, which includes a crystalline resin; and
    an outer tube, which includes an outer resin layer covering an outer periphery of the inner tube and, in the outer resin layer, includes a plurality of metal wires buried in parallel with an axial direction of the inner tube and at equal intervals in a circumferential direction of the inner tube, wherein a primer applied to a surface of the metal wires adheres the plurality of metal wires to the outer resin layer so as to inhibit relative movement between the plurality of metal wires and the outer resin layer, a thickness of the inner tube is from 50 to 1,000 µm, and a thickness of the outer resin layer is from 0.2 to 2.0 mm, and the outer resin layer includes a resin having a storage elastic modulus according to dynamic viscoelasticity of not more than 3,000 MPa.

2. The outer casing for a control cable for vehicles according to claim 1, wherein the crystalline resin included in the inner tube has a melting point of 120° C. or higher.

3. The outer casing for a control cable for vehicles according to claim 2, wherein a resin included in the outer resin layer is a thermoplastic elastomer or a soft vinyl chloride resin.

4. A control cable comprising the outer casing for a control cable for vehicles according to claim 3, and an inner cable inserted into the outer casing for a control cable.

5. The outer casing for a control cable for vehicles according to claim 2, wherein the crystalline resin included in the inner tube has a melting point of 265° C. or lower.

6. A control cable comprising the outer casing for a control cable for vehicles according to claim 2, and an inner cable inserted into the outer casing for a control cable.

7. The outer casing for a control cable for vehicles according to claim 1, wherein a resin included in the outer resin layer is a thermoplastic elastomer or a soft vinyl chloride resin.

8. A control cable comprising the outer casing for a control cable for vehicles according to claim 7, and an inner cable inserted into the outer casing for a control cable.

9. The outer casing for a control cable for vehicles according to claim 1, wherein a contact surface between the inner tube and the outer resin layer has been subjected to an adhesion treatment so as to bond the inner tube to the outer resin layer.

10. The outer casing for a control cable for vehicles according to claim 9, wherein the adhesion treatment is corona discharge, plasma irradiation, or primer treatment.

11. A control cable comprising the outer casing for a control cable for vehicles according to claim 1, and an inner cable inserted into the outer casing for a control cable such that the inner cable slidably contacts with a surface of the outer casing for a control cable.

12. The control cable according to claim 11, wherein the inner cable is a single cable inserted into the outer casing for the control cable.

13. The outer casing for a control cable for vehicles according to claim 1, wherein a difference between a melting point (T1) of the crystalline resin in the inner tube and a melting point or a glass transition point (T2) of a resin forming the outer resin layer is in a range of from more than 0 to +130° C.

14. The outer casing for a control cable for vehicles according to claim 13, wherein the crystalline resin in the inner tube includes at least one selected from the group consisting of nylon 66, nylon 6, polybutylene terephthalate, polyoxymethylene, polymethylpentene, polypropylene, and high density polyethylene, and a resin contained in the outer resin layer includes at least one selected from the group consisting of soft vinyl chloride, a styrene-based thermoplastic elastomer, an urethane-based thermoplastic elastomer, an ester-based thermoplastic elastomer, a polyethylene-based thermoplastic elastomer, and an olefin-based thermoplastic elastomer in which EPDM (ethylene-propylene-diene rubber) or ethylene propylene copolymer is dispersed.

15. The outer casing for a control cable for vehicles according to claim 14, wherein the primer includes at least one selected from the group consisting of a resin solution of polyolefin treated with polar group, a copolymer of an epoxy group-containing monomer, chlorinated polyolefin, chlorinated ethylene-vinyl acetate copolymer, and an aqueous or solvent dispersion of olefin resin particles.

16. The outer casing for a control cable for vehicles according to claim 1, wherein the primer includes at least one selected from the group consisting of a resin solution of polyolefin treated with polar group, a copolymer of an epoxy group-containing monomer, chlorinated polyolefin, chlorinated ethylene-vinyl acetate copolymer, and an aqueous or solvent dispersion of olefin resin particles.

17. The outer casing for a control cable for vehicles according to claim 1, wherein the metal wires are provided with irregularities intermittently in a longitudinal direction of the metal wires.

18. A method of manufacturing an outer casing for a control cable for vehicles, the method comprising:

forming an outer tube including an outer resin layer and a plurality of metal wires buried in the outer resin layer by inserting, into a die of an extrusion forming machine, an inner tube including a crystalline resin, together with the plurality of metal wires in parallel with an axial direction of the inner tube and at equal intervals in a circumferential direction of the inner tube, and by extruding a resin around an outer periphery of the inner tube while feeding out the inner tube and the plurality of metal wires from the die, wherein a thickness of the inner tube is from 50 to 1,000 µm, a thickness of the outer resin layer is from 0.2 to 2.0 mm, and the outer resin layer includes a resin having a storage elastic modulus according to dynamic viscoelasticity of not more than 3,000 MPa, and wherein a surface of the metal wires has a primer applied thereto, and the primer adheres the plurality of metal wires to the outer resin layer so as to inhibit relative movement between the plurality of metal wires and the outer resin layer of the outer casing for the control cable for vehicles.

19. The method of manufacturing an outer casing for a control cable for vehicles according to claim 18, wherein the primer is applied before the forming of the outer tube.

20. The method of manufacturing an outer casing for a control cable for vehicles according to claim 18, wherein the metal wires are provided with irregularities intermittently in a longitudinal direction of the metal wires.

* * * * *